3,341,536
2-MORPHOLINO, OR PIPERIDINO ALKYL SULFINYL OR SULFONYL-PYRIDINES AND HALO PYRIDINES
Helmut Beschke, Frankfurt am Main, and Wilhelm Schuler, Bad Homburg vor der Hohe, Germany, assignors to Deutsche Gold- und Silber-Scheideanstalt vormals Roessler, Frankfurt am Main, Germany
No Drawing. Filed July 9, 1964, Ser. No. 381,577
Claims priority, application Germany, July 11, 1963, D 41,963
8 Claims. (Cl. 260—247.1)

The present invention relates to novel pyridine derivatives of the general formula

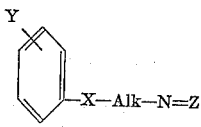

as well as their salts and quaternary ammonium compounds.

In such formula

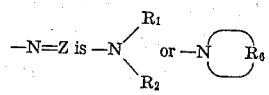

wherein $R_1$ and $R_2$ are lower alkyl groups, $R_6$ is an alkylene, oxa alkylene or aza alkylene group forming a 5 or 6 membered ring with the nitrogen atom to which it is attached, examples of such heterocyclic rings, for instance, are morpholino and piperidino, Alk is a lower straight or branch chained alkylene radical of at most 4 carbon atoms, X is —SO— or —$SO_2$—, Y is hydrogen, halogen, such as chlorine or bromine, preferably in position 3, lower alkyl, preferably methyl, trihalogenomethyl lower alkoxy, preferably methoxy,

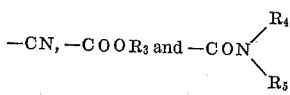

wherein each of $R_3$, $R_4$ and $R_5$ are hydrogen or lower alkyl.

The novel compounds according to the invention have been found to possess good analgesic activity.

The compounds according to the invention can be prepared from the corresponding mercapto compounds, that is, compounds corresponding to the above formula where X=—S— or their salts by oxidation of such mercapto compounds in a known manner. The free bases which are produced can be converted into their acid addition salts or quaternary ammonium compounds. Preferably acids having pharmaceutically acceptable anions, such as hydrochloric, sulfuric, phosphoric, maleic, citric and the like acids are employed in the preparation of the salts, but, of course, any given salt is easily convertible into any other more desired salt or the free base.

The starting mercapto compounds are prepared according to the procedures disclosed in copending application S.N. 267,335, filed Mar. 22, 1963, now abandoned, for example, by reacting a pyridine of the formula

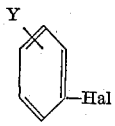

in which Hal is chlorine or bromine with a compound of the formula

The reaction preferably is carried out at raised temperatures with the aid of basic condensing agents such as potash, sodium ethylate, sodium amide or other basic substances such as tertiary amines.

As oxidizing agents for the conversion of the corresponding mercapto compounds to the compounds according to the invention it is possible, for instance, to use such known oxidizing agents as hydrogen peroxide, potassium permanganate, peracetic acid or nitric acid. Hydrogen peroxide is the preferred oxidizing agent when sulfoxides (X=—SO—) are the desired products and potassium permanganate when the sulfones (X=—$SO_2$—) are the desired products. The oxidation expediently is carried out in the presence of water or organic solvents, such as alkanols, acetic acid, ethyl acetate, benzine, acetone or chloroform. The lower alkanols and acetic acid are especially well suited solvents.

The following examples will serve to illustrate the invention with reference to several specific embodiments thereof. In such examples the proportions are given by weight unless otherwise specified.

EXAMPLE 1

48 parts of 2-(morpholinoethylmercapto-)pyridine were dissolved in 250 parts of methanol and acidified to a pH of 4 with methanolic HCl. The solution was heated to 50° C. and 23 parts of 35% hydrogen peroxide added thereto. The mixture was then refluxed for 5 hours and subsequently boiled down under vacuum and the residue recrystallized from ethanol. 42 parts of the monohydrochloride of 2-(morpholinoethylsulfinyl-)pyridine were obtained. The melting point thereof was 186° C.

EXAMPLE 2

20 parts of 2-(morpholinoethylmercapto-)-3-chloro-pyridine were dissolved in 200 parts of methanol and acidified to a pH of 4 with methanolic HCl. The solution was heated to 50° C. and 8 parts of 35% hydrogen peroxide added thereto. The mixture was refluxed for 5 hours, then boiled down under vacuum and the residue recrystallized from methanol. 19.5 parts of the hydrochloride of 2-(morpholinoethylsulfinyl-) - 3 - chloropyridine were obtained. The melting point was 202° C. (decomposition).

Analogously using the corresponding tertiary aminoalkylmercaptopyridines, the following sulfoxides were obtained. The melting points given are for the hydrochlorides unless otherwise specified.

(a) 2-(morpholinoethylsulfinyl-)-6-chloropyridine; M. P.=193° C.

(b) 2-(diethylaminoethylsulfinly-)-6-chloropyridine; M. P.=115° C.

(c) 2-(piperidinoethylsulfinyl-)-pyridine; M.P.=188° C.

(d) 2-(piperidinoethylsulfinyl-)-6-chloropyridine; M. P. 191–192° C.

(e) 2 - (diethylaminoethylsulfinyl - ) - pyridine; M.P. 142–144° C.

(f) 2-(morpholinoethylsulfinyl-)-6-bromo-pyridine; M. P.=200–202° C.

(g) 2-(morpholinoethylsulfinyl-)-5-chloro-pyridine; M. P.=216–218° C.

(h) 2-(morpholinoethylsulfinyl-)-3-cyano-pyridine; M. P.=210° C.

(i) 2-(3'-morpholinopropylsulfinyl(2'))-pyridine; M. P. (fumarate) =130° C.

(j) 2-(diethylaminoethylsulfinyl-)-5-chloropyridine M. P. (fumarate) =124–126° C.

(k) 2-(diethylaminoethylsulfinyl-)-3-chloropyridine; M. P.=204–205° C.

EXAMPLE 3

50 parts of 2-(morpholinoethylmercapto-)-3-chloropyridine were dissolved in 450 parts of glacial acetic acid. After the solution had been heated to 40° C., 55 parts of potassium permanganate, dissolved in 500 parts of water, were added portionwise. During such addition the temperature rose to 65° C. The reaction mixture was stirred for a further hour and then filtered, using kieselguhr as filter aid, to remove the manganese dioxide formed. A small quantity of formic acid was added to the filtrate to destroy any remaining permanganate which might have been present. After being rendered alkaline it was extracted with benzene. When the benzene extract was boiled down, 35 parts of the crystalline free base of 2-(morpholinoethylsulfonyl-)-3-chloro-pyridine were obtained. The hydrochloride thereof was precipitated from its solution in methanol with HCl. The melting point of such hydrochloride was 219° C.

Analogously using the corresponding tertiary aminoalkylmercaptopyridines, the hydrochlorides of the following sulfones were obtained. The melting points given are for the hydrochlorides.

(a) 2-(morpholinoethylsulfonyl-)-6-chloropyridine; M.P.=211° C.
(b) 2 - (morpholinoethylsulfonyl - ) - pyridine; M.P.=222-225° C.
(c) 2-(morpholinoethylsulfonyl-)-6-bromopyridine; M.P.=207-210° C.
(d) 2-(morpholinoethylsulfonyl-)-5-chloropyridine; M.P.=237-240° C.
(e) 2 - (diethylaminoethylsulfonyl - ) - pyridine; M.P.=208-210° C.
(f) 2-(diethylaminoethylsulfonyl-)-6-chloropyridine; M.P.=151-153° C.
(g) 2 - (diethylaminoethylsulfonyl-)-5-chloropyridine; M.P.=138-140° C.

We claim:
1. A pyridine compound of the formula

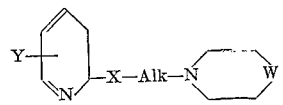

wherein X is selected from the group consisting of —SO— and —SO$_2$—, Alk is lower alkylene of up to 4 carbon atoms, Y is selected from the group consisting of hydrogen and halogen and W is selected from the group consisting of —O— and —CH$_2$—.

2. A pyridine compound of the formula

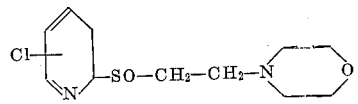

3. A pyridine compound of the formula

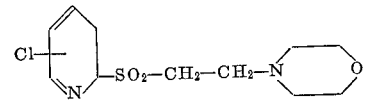

4. 2-(morpholinoethylsulfinyl)-6-chloro-pyridine.
5. 2-(morpholinoethylsulfinyl)-pyridine.
6. 2-(piperidinoethylsulfinyl)-6-chloro-pyridine.
7. 2-(morpholinoethylsulfonyl)-6-chloro-pyridine.
8. 2-(morpholinoethylsulfonyl)-pyridine.

References Cited

Semonsky et al.: Chemical Abstracts, vol. 50, page 3438i (1956).

ALEX MAZEL, *Primary Examiner.*

NICHOLAS S. RIZZO, *Examiner.*

J. TOVAR, *Assistant Examiner.*